June 27, 1933.     W. FERRIS     1,915,986
VARIABLE SPEED DRIVE FOR MACHINE TOOLS
Filed April 25, 1927     4 Sheets-Sheet 3
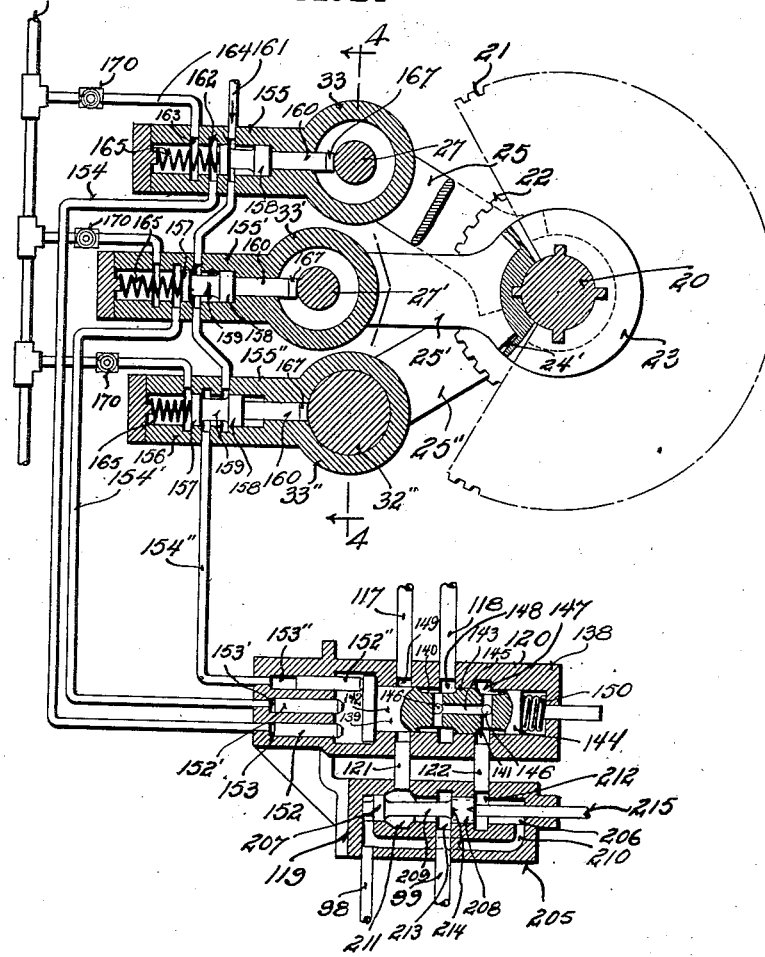
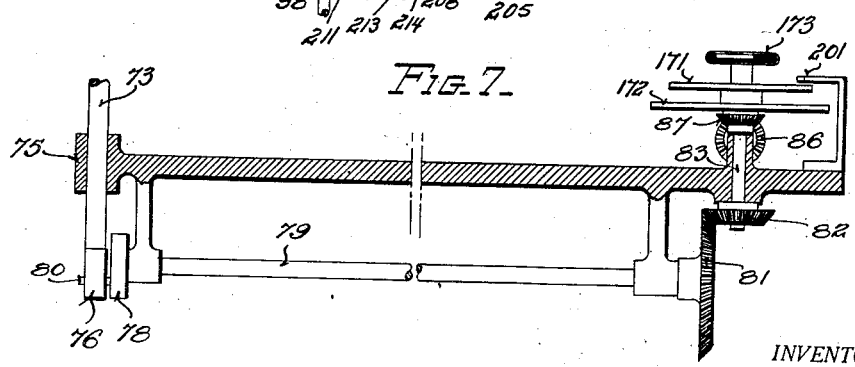
INVENTOR.
WALTER FERRIS
BY
ATTORNEY.

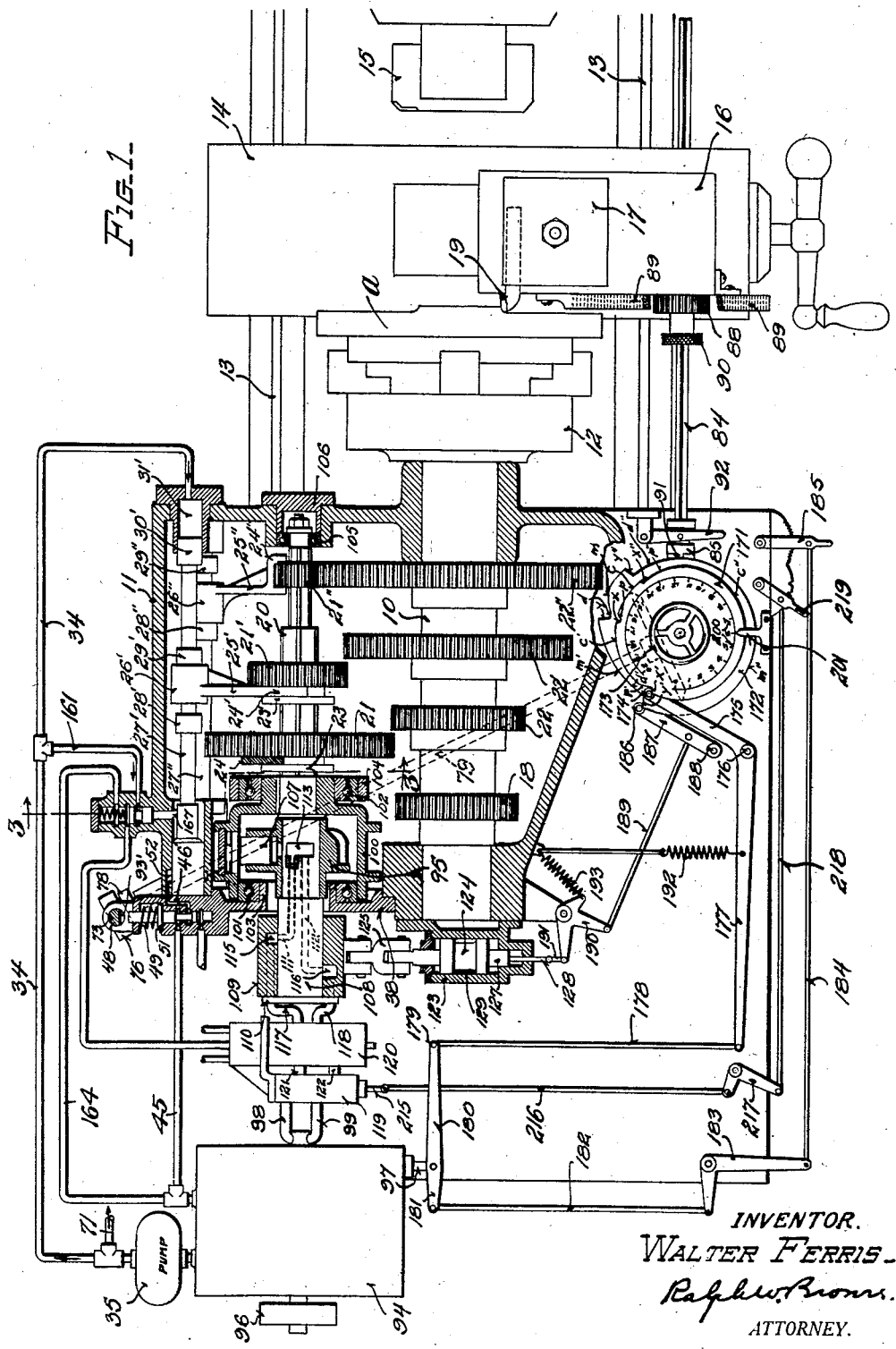

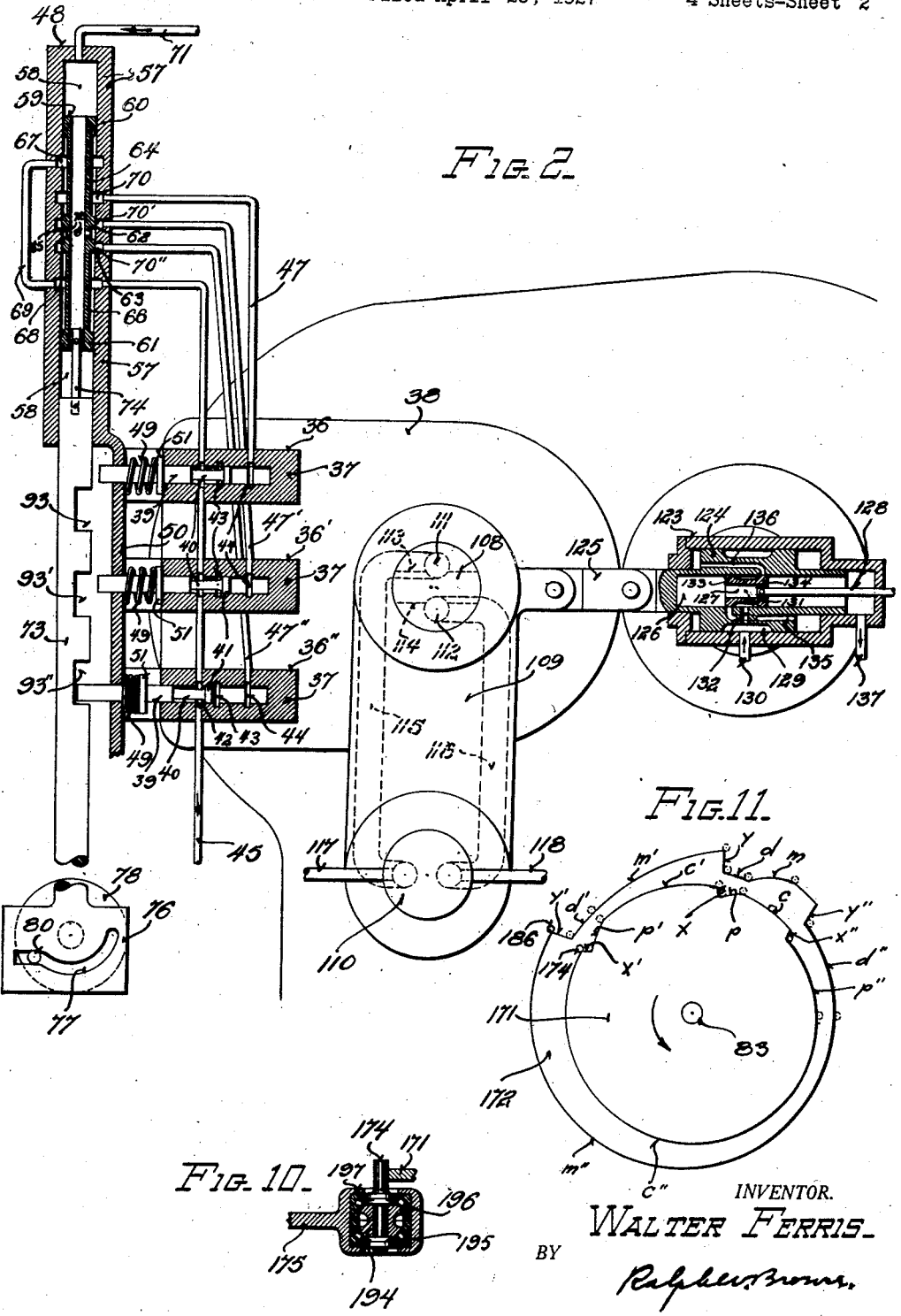

June 27, 1933.  W. FERRIS  1,915,986
VARIABLE SPEED DRIVE FOR MACHINE TOOLS
Filed April 25, 1927  4 Sheets-Sheet 4
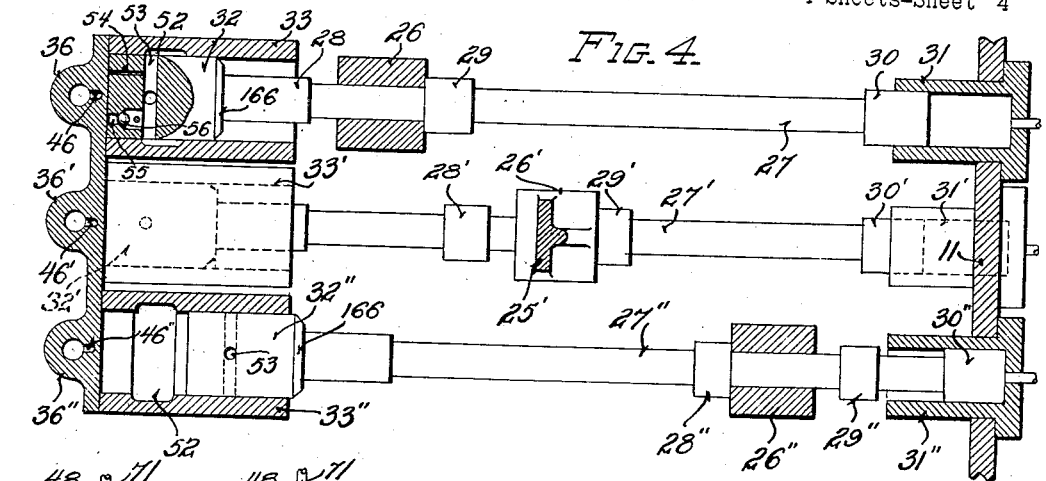
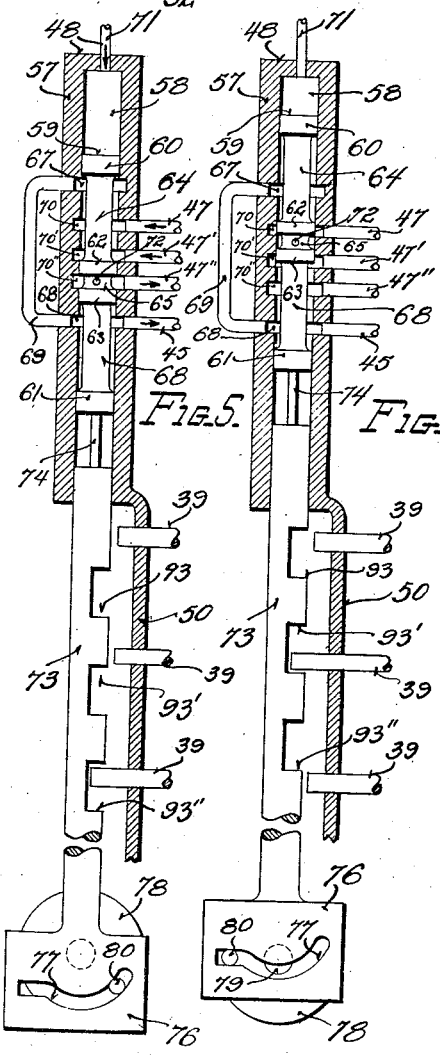
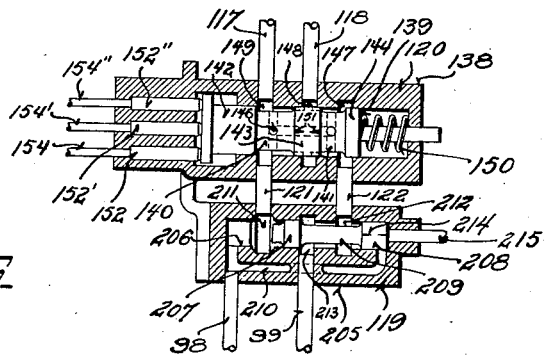
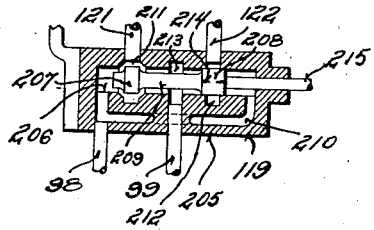
INVENTOR.
WALTER FERRIS
BY
*Ralph E. Brown*
ATTORNEY.

Patented June 27, 1933

1,915,986

UNITED STATES PATENT OFFICE

WALTER FERRIS, OF MILWAUKEE, WISCONSIN, ASSIGNOR TO THE OILGEAR COMPANY, OF MILWAUKEE, WISCONSIN, A CORPORATION OF WISCONSIN

VARIABLE SPEED DRIVE FOR MACHINE TOOLS

Application filed April 25, 1927. Serial No. 186,554.

This invention relates to variable speed drives for machine tools and the like.

For purposes of description and explanation an embodiment of the present invention will be described as applied to a multiple turret lathe although certain of the novel features thereof may be advantageously employed in machines of various other types.

The rate of relative motion between the work and tool in the direction of the cutting action is of importance from the standpoint of mechanical efficiency and smoothness of cut, and the rate selected is ordinarily governed by the character of the material operated upon, the material of which the tool is made and the nature of the cut. In performing a facing cut, as in a lathe, by rotating the work against the tool during the slow advance of the tool across the face of the work, the cutting speed normally varies, due to the varying distance between the tool and the axis of rotation. In an effort to approximate a constant cutting speed, attempts have heretofore been made to vary the rotating speed by driving the work spindle through mechanical change speed gear sets of various types. Due to the step by step character of the speed variation obtainable by mechanical change speed gears and because of the limited speed range ordinarily provided by such mechanisms these prior efforts to obtain constant cutting speeds in all positions of the tool relative to the axis of rotation have not proven entirely satisfactory.

One object of the present invention is the provision of a variable speed drive mechanism capable of effecting a substantially uniform variation in operating speeds through an unusually wide range. This I have accomplished by the use of a plurality of separate variable speed transmissions combined to increase the speed range, one of them possessing the property of producing a substantially uniform speed variation and coordinated with the other in such manner as to effect a uniform variation throughout the extended range.

In this combination I prefer to use a variable speed hydraulic transmission of a well known type involving a variable speed motor driven by a solid column of liquid supplied from a constant speed pump, although other types of motors capable of operating at variable speeds might be employed. When a hydraulic motor is used I prefer to vary the speed thereof primarily by regulating motor displacement, to thereby permit the pump to operate at full capacity throughout the speed range, although changes in pump displacement may be resorted to to thereby further increase the speed range. By the use of a hydraulic transmission of the type mentioned combined and properly coordinated with a mechanical change speed gear set, it is possible to greatly reduce the number of separate gear changes required in lathe spindle drives heretofore used, to greatly increase the speed range and to obtain a smooth variation in speed throughout the increased range.

Another object of the present invention is the provision in a variable speed drive mechanism involving a step by step variable speed transmission and a uniform variable speed transmission of means for so coordinating said transmissions as to effect a substantially uniform variation in speed throughout a wide range.

Another object of the present invention is the provision of fluid actuated means for effecting the change speed functions of a mechanical change speed gear set.

Another object of the present invention is the provision in a mechanical change speed gear set of means for automatically rendering the drive mechanism for said set momentarily inactive during each speed changing period.

Another object is the provision in a machine tool of a variable speed drive automatically operable to maintain a substantially constant cutting speed with the tool at various distances from the axis of rotation.

Other objects and advantages will appear from the following description of an illustrative embodiment of the present invention.

In the drawings:—

Figure 1 is a horizontal sectional view of a head-stock of a lathe equipped with a hydraulic drive embodying the novel features of the present invention.

Fig. 2 is a fragmentary end elevation, with parts in section.

Fig. 3 is a transverse sectional view taken substantially along the line 3—3 of Figure 1.

Fig. 4 is a sectional view taken substantially along the line 4—4 of Figure 3.

Figs. 5 and 6 are sectional views of the control valve of Figure 2, showing the same in different operating positions.

Fig. 7 is a detail view of the mechanism employed for operating the control valve.

Fig. 8 is a sectional view of the motor control valves of Figure 3, showing the same in different positions.

Fig. 9 is a similar view of one of the valves in a third position.

Fig. 10 is a detail view of a cam roller.

Fig. 11 is a face view, on a larger scale, of the cams shown in Figure 1.

For purposes of illustration and explanation an embodiment of the present invention is shown applied to a multiple turret lathe of a well known type. The lathe shown includes the usual spindle 10 journaled in the head stock 11, and carrying a chuck 12 above and adjacent one end of the customary ways 13. A cross-slide conventionally shown at 14 is mounted for travel along the ways 13 toward and from the chuck in the usual manner. The ways also constitute a support and guide for the usual turret carriage (not shown) upon which a series of tools, one of which is shown at 15, are ordinarily mounted. A tool carriage 16, supporting the usual turret 17, is mounted for travel lengthwise of the cross-slide, and is driven through the usual mechanism (not shown) from an appropriate gear 18 on the spindle 10. In this instance a cutting tool 19 is shown clamped in the turret 17 so as to travel across the face of a work piece a during rotation of the work with and by the chuck 12.

The spindle is driven by novel means capable of effecting a substantially uniform variation in rotating speeds throughout a wide range. Provision is also made for coordinating the variation in rotating speeds with the variation in distance between the cutting tool 19 and the center of rotation, so that the actual cutting speeds may be substantially the same in all positions of the tool. These functions are accomplished, in the lathe shown, by mechanism such as will now be described.

The spindle 10 is driven from a shaft 20 through a plurality of gear sets selectively operable to establish various speed ratios between the shaft and spindle. In this instance three such gear sets are provided, the shaft 20 having three gears 21, 21', and 21'' splined thereon and selectively shiftable into intermeshing relation with three gears 22, 22', and 22'', respectively, fixed on the spindle.

Gears 21 and 21' carry flanged collars 23 and 23' fashioned in a well known manner to receive the forked ends 24 and 24', respectively, of appropriate shifting arms 25 and 25'. A third shifting arm 25'' is forked at one end 24'' to embrace the small gear 21''. The control arms 25, 25' and 25'' are formed at their other ends with sleeve portions 26, 26' and 26'' slidably mounted upon separate control rods 27, 27' and 27'', respectively. As shown particularly in Figure 4 sleeve portion 26'' is confined between spaced collars 28'' and 29'' so as to permit limited end play between it and the rod 27''. Sleeve portion 26' is similarly confined between collars 28' and 29' on rod 27', and sleeve portion 26 is similarly confined between an abutment 28 and collar 29 on rod 27.

Each of the rods 27, 27' and 27'' is hydraulically actuated lengthwise and controlled preferably by means such as will now be described. Each rod is fixed at one end in a small piston 30, 30' or 30'', each piston being closely fitted for reciprocation within a cylinder 31, 31' or 31'' removably fixed within the head stock 11. The other end of each rod is fixed to a large piston 32, 32' or 32'' closely fitted for reciprocation in cylinders 33, 33' and 33'', respectively, formed in the head stock. The several cylinders 31, 31' and 31'' are maintained flooded with liquid under pressure, supplied through a pipe 34 from an appropriate pressure source, such as a gear pump 35 of a well known type. The admission of hydraulic pressure to and exhaust from the other cylinders 33, 33' and 33'' are controlled by separate valves 36, 36' and 36'', respectively, of appropriate form.

The construction and operation of the three valves 36, 36' and 36'' are substantially identical so that a description of one will suffice for all. Each valve shown comprises a body portion 37 formed as an integral part of a removable end plate 38, and bored longitudinally to receive a plunger 39 closely fitted for reciprocation therein. Each plunger 39 is reduced at 40 and provided with a piston head 41 at one end thereof. Three annular grooves 42, 43 and 44 are formed in the body portion encircling the plunger 39. Groove 42 of each valve communicates with an exhaust pipe 45, groove 43 with a duct 46, 46' or 46'' leading to one of the cylinders 33, 33' or 33'', and groove 44 with a pipe 47, 47' or 47'' to which hydraulic pressure may be supplied through an appropriate control valve 48, such for instance as will be later described. A spring 49 interposed between a bracket plate 50 and a collar 51 on the plunger 39 yieldably retains the plunger of each valve in the inner position assumed by valves 36 and 36' in Figure 2. In this position communication is established between grooves 42 and 43 through the reduced portion 40 of the plunger, so that the corresponding cylinders 33 and 33' are open to the exhaust pipe 45. The application of hydraulic pressure to any of the three pipes 47, 47' or 47", however, is transmitted through groove 44 to the end of the associated plunger 39, and the plunger is forced outwardly against the spring 49 into the posi'ion assumed by valve 36" in Figure 2. In this position of the plunger communication is established between grooves 44 and 43 and thus pressure is transmitted through the duct 46" to the corresponding cylinder 33".

It will be noted that rods 27, 27' and 27" are at all times urged toward the left (Figs. 1 and 4) by the pressure maintained in the cylinders 31, 31' and 31", so that when cylinders 33, 33' and 33" are open to exhaust the three gears 21, 21', and 21" are out of mesh with the cooperating gears 22, 22' and 22". Whenever any of the cylinders 33, 33' or 33" are exposed to pressure however the corresponding rod 27, 27' or 27" is shifted toward the right (Figs. 1 and 4) due to the greater size of these cylinders, and the corresponding gear 21, 21' or 21" is shifted into mesh with its cooperating gear 22, 22' or 22". Thus with the plunger 39 of valve 36" in the outer position of Figure 2, and the plungers of valves 36 and 36' in the inner position, rod 27" is in advanced position with gear 21" in mesh with gear 22", and rods 27 and 27' are in normal retracted position with gears 22 and 22' out of mesh with gears 21 and 21'.

Provision is preferably made for retarding the advance of each rod 27, 27' and 27" toward the right (Figs. 1 and 4) without interfering with the rapid retracting movement thereof toward the left, to thereby insure disengagement between one set of gears before the next set of gears are thrown into mesh. To this end each duct 46, 46' and 46" leading from the corresponding valves 36, 36' and 36" communicates with its respective cylinder 33, 33' or 33", through an annular chamber 52 formed in the cylinder wall in such position as to be covered by the piston 32, 32' or 32" when the piston is in inner retracted position. Cross ducts 53 in each piston communicate with this chamber when the piston is retracted, and a bleed duct 54 maintains restricted communication between ducts 53 and the interior of the cylinder. A larger duct 55, controlled by a check valve 56, also connects ducts 53 with the interior of the cylinder. The arrangement is such that, with one of the pistons in retracted position such as is assumed by piston 32 in Figure 4, hydraulic pressure applied to the corresponding duct 46 is transmitted through chamber 52, cross ducts 53, and bleed duct 54 to the closed end of the cylinder 33, and the piston is advanced at a very slow rate because of the restriction afforded by the bleed duct. It is of course understood that under this condition the check valve 56 is closed by the pressure in the cross duct. The piston thus advances at this slow rate until the chamber 52 is uncovered by the end of the piston, after which the piston advances quickly. Upon releasing the pressure in duct 46 the piston is free to return rapidly due to the free passage of the liquid through the larger duct 55, cross ducts 53, and chamber 52.

The control valve 48 hereinabove mentioned is shown in Figures 2, 5 and 6. It comprises a substantially cylindrical body portion 57, supported in upright position upon the bracket plate 50, and longitudinally bored, as at 58, to receive a hollow plunger 59, having end heads 60 and 61 and intermediate heads 62 and 63 connected by reduced portions 64, 65, and 66. Two annular grooves 67 and 68 communicate at all times with the annular chambers surrounding the reduced portions 64 and 66 and are connected by a pipe 69. Exhaust pipe 45 connects with groove 68 and consequently with groove 67. Three intermediate grooves 70, 70' and 70", communicating with the pipes 47, 47' and 47", respectively, are controlled by the intermediate heads 62 and 63. The ends of the bore 58 and interior of the plunger 59 are flooded with liquid under pressure supplied through a pipe 71 from the supply pipe 34. This pressure is transmitted through ports 72 to the annular chamber surrounding the reduced portion 65 of the plunger.

The arrangement is such that with the plunger 59 in the lower position of Figure 5, groove 70" is open to the space surrounding the reduced portion 65, so that pipe 47" is exposed to the pressure in pipe 71; and both grooves 70 and 70' are open to the space surrounding the reduced portion 64, so that pipes 47 and 47' are open to the exhaust pipe 45. In this position of the control valve the pressure in pipe 47" has forced the valve 36" outwardly and the piston 32", and the rod 27" have been advanced by the pressure in duct 46" in the manner hereinabove described and the small gear 21" is engaged with the large gear 22" on the spindle 10. Furthermore since no pressure exists in pipes 47 and 47', the plungers of valves 36 and 36' are in the inner position shown and cylinders 33 and 33' are open to the exhaust pipe 45, so that pistons 32 and 32' are retracted and gears 22 and 22' are out of mesh with gears 21 and 21'. Under this condition the spindle 10 is driven at a slow rate.

This condition maintains until the plunger 59 of the control valve, in its upward movement, approximates the position shown in Figure 2. When this occurs groove 70" is opened to the space surrounding the reduced portion 66 and simultaneously groove 70' is opened to the space surrounding the reduced portion 65, so that the pressure in pipe 71 is applied to pipe 47' and the pipe 47'' is simultaneously opened to exhaust. Groove 70 and pipe 47 remain open to exhaust. When this occurs valve 36 remains unaffected but the plunger 39 of valve 36'' moves inwardly, under the action of spring 49 while the plunger of valve 36' moves outwardly, so that cylinder 33'' is opened to exhaust and piston 32'' and rod 27'' are retracted rapidly to thereby withdraw gear 21'' from gear 22'', and so that the cylinder 33' is exposed to pressure and piston 32' and rod 27' advanced slowly in the manner hereinabove described until gear 21' is ultimately engaged with gear 22'. The spindle 10 is thus driven at intermediate speed. This condition maintains until the plunger 59, in its upward advance, approximates the position shown in Figure 6. When this occurs groove 70 is opened to the pressure in the space surrounding the reduced portion 65 and simultaneously groove 70' is opened to exhaust through the space surrounding the reduced portion 66, the groove 70'' remaining open to exhaust through the space last mentioned. This causes a rapid retraction of the piston 32' and rod 27' with a consequent disengagement of gears 22' and 21' and a slow advance of piston 32 and rod 27 to ultimately effect engagement of gears 22 and 21, in the manner hereinabove described. The spindle 10 is then driven at high speed. This condition maintains until upward movement of the plunger 59 ceases.

Provision is made in the lathe shown for automatically operating the valve plunger 59 in accordance with movements of the tool carriage 16 along the cross-slide 14. To this end a control rod 73 is connected to the plunger 59 through an appropriate link 74. The control rod 73 is guided for vertical reciprocation in the lower end of the bore 58 and in an appropriate bracket 75 fixed to the head stock, and carries at its lower end a plate 76 having a cam slot 77 therein. A disk 78, fixed to one end of and driven by a shaft 79, carries a crank pin 80 closely fitted for travel within the slot 77. The shaft 79 extends diagonally across the lathe within the base thereof, as indicated in Figure 1, and at its other end carries a driving gear 81 meshing with and driven by a smaller gear 82 on a vertical shaft 83. (See Figure 7.) Shaft 83 is driven from a shaft 84 (Fig. 1), through a clutch 85 and mitre gears 86 and 87. A gear 88 splined on shaft 84 normally meshes with a rack 89 fixed to the side of the tool carriage 16. The gear 88 may be shifted along the shaft 84 out of mesh with the rack 89 and for this purpose is provided with a knurled hub extension 90 constituting a convenient hand hold. The clutch 85 is of the usual jaw clutch type except that it is provided with only one tooth 91, instead of a plurality of teeth, to thereby facilitate reestablishing a predetermined angular relation between the shaft 84 and gear 87 upon reclosing the clutch. The clutch is controlled by an appropriate handle 92. The gears 81 and 82 are preferably so proportioned as to effect only a partial rotation of the crank disk 78 during travel of the tool carriage 16 throughout its normal range. The cam slot 77 shown is curved for the major portion of its length with a radius of curvature substantially equal to the radius of curvature of the path of the crank pin 80, the remainder of the slot being substantially straight and transversely extended. By shaping the slot in this manner the rod 73 and valve plunger 59 move through a very short distance, from the position shown in Figure 5 to that of Figure 2, while the crank pin 80 travels through a rather wide arc; and while the crank pin travels through a rather limited arc, from the position of Figure 2 to the position of Figure 6, the rod 73 and plunger 59 travel through a distance greater than the first. The purpose of this arrangement will hereinafter appear.

During normal feed movements of the tool carriage 16 the motion of the plunger 59 of the control valve is so slow as to permit ample time for the completion of each of the successive gear shifting actions hereinabove described, but when the shaft 79 is rotated rapidly by hand, it is highly desirable that movement of the valve plunger 59 be temporarily arrested at each gear shifting position thereof in order to permit the completion of each gear shifting operation. This is accomplished in this instance by the use of interlocking mechanism such as will now be described. Three recesses 93, 93' and 93'' are formed in the side of the rod 73 for cooperation with the plunger 39 of the valves 36, 36' and 36'', respectively. The arrangement of the recesses is such that in the lower position of the valve plunger 49 (Fig. 5) the exposed end of plunger 39 of valve 36'' projects into the recess 93'', and thus prevents the rod 73 and plunger 59 from moving upwardly beyond the position shown in Figure 2, until the plunger 39 of valve 36'' has been shifted inwardly in the manner hereinabove described to initiate the operation of the gear shifting mechanism. In the position shown in Figure 2 the recess 93' has become aligned with the end of plunger 39 of valve 36', so that the end of plunger 39 engages therein as it is forced outwardly substantially simultaneously with the inward shifting of plunger 39 of valve 36'', in the manner hereinabove described. The engagement of this plunger 39 in recess 93' prevents upward movement of the rod 73 and plunger 59 beyond the position shown in Figure 6, until this plunger has been shifted inwardly to initiate the next gear shifting operation, at which time the plunger 39 of valve 36 moves outwardly and engages in recess 93. The engagement of plunger 39 within recess 93 limits the upward movement of the plunger 73 and valve plunger 59. During downward movement of the valve plunger 59 the above described operations occur in reverse order, and movement of the plunger is temporarily arrested at each gear shifting position to permit completion of the gear shifting action.

The shaft 20 is driven from an appropriate power source through a variable speed hydraulic transmission including a variable displacement pump 94 of a well known type and a similar variable displacement hydraulic motor 95. The pump shown is fully described in my prior Patent No. 1,558,002 issued October 20, 1925. It will therefore suffice here to state that the same is driven at constant speed through appropriate means, such as a pulley 96, and that the displacement thereof may be varied from zero to a maximum by longitudinal adjustment of a control stem 97 to thereby regulate the rate and direction of flow of liquid in pipes 98 and 99, constituting the two sides of a hydraulic circuit fed thereby. The control stem 97 in this instance is actuated and controlled by mechanism to be hereinafter described. The essential elements of the motor 95 are substantially identical with those of the pump. The motor includes a cage 100 rotatably supported by ball bearings 101 and 102 and keyed to the end of the shaft 20. Bearing 101 is supported upon an inturned circular flange 103 forming a part of the removable end plate 38 of the head stock and bearing 102 is supported within a rigid bridge piece 104 within the head stock. The forward end of shaft 20 is supported in a ball bearing 105 disposed within a cup element 106 removably fixed within the forward end of the head stock. The cage 100 is driven by a circular series of piston and cylinder assemblies 107 mounted for rotation about a pintle 108. The pintle is carried by an upright arm 109 rockably supported at its lower end upon a shaft 110 firmly anchored in the rear wall of the head stock. The pintle 108 is provided with the usual passages 111 and 112 which communicate with the usual ports 113 and 114, respectively, formed in the top and bottom of the pintle for cooperation with the piston and cylinder assemblies in the usual manner. Passages 111 and 112 communicate, respectively, with passages 115 and 116 formed in the arm 109 and which in turn communicate with pipes 117 and 118 constituting two sides of the motor circuit. Pipes 98 and 99 from the pump are connected with pipes 117 and 118 from the motor through two control valves 119 and 120, such for instance as will be hereinafter described. These valves are connected through pipes 121 and 122 to complete the circuit between the pump and motor through which the motor is driven.

The displacement of the motor 95 is regulated by swinging the arm 109 to thereby shift the pintle 108 and thus regulate the degree of eccentricity of the pintle with respect to the axis of rotation of the cage 100. This is accomplished in this instance by a hydraulically operated stroke change mechanism of a well known type, such for instance as that shown in Figure 2. This mechanism includes a cylinder 123 fixed to the end of the head stock and enclosing a hollow piston 124 reciprocable therein. Piston 124 is connected to the arm 109 through appropriate linkage 125 and is longitudinally bored, as at 126 to receive a hollow plunger 127 reciprocable therein and controlled by a stem 128. An annular chamber 129 surrounding the piston 124 is supplied with liquid under pressure through a pipe 130, connected with pipe 34 leading from the gear pump 35. A similar chamber 131 surrounds the plunger 127 and communicates with chamber 129 through a duct 132. The plunger 127 is further provided with end heads 133 and 134 which control ducts 135 and 136 in the piston 124 leading to the opposite ends of the cylinder 123. The bore 126 of the piston is open to exhaust through a pipe 137 connected with exhaust pipe 45. The ducts 135 and 136 are normally closed by the end heads 133 and 134, respectively. The arrangement is such that when the plunger 127 is shifted through a definite distance toward the right, the left end of the cylinder is exposed to pressure through duct 136, chamber 131, duct 132, chamber 129 and pipe 130, and the right end of the cylinder is opened to exhaust through duct 135, bore 126 and pipe 137, so that the piston immediately moves toward the right through a corresponding distance, until the ducts 135 and 136 are again closed by the end heads 133 and 134. The arm 109 and pintle 108 are thus shifted through a distance corresponding to the movement of the plunger 127 and stem 128. A similar reverse action occurs when the stem 128 is shifted toward the left. The stem 128 is actuated and controlled by mechanism which will be hereinafter described.

Provision is made in the lathe shown for bringing the shaft 20 to rest during each gear shifting stage to facilitate the gear shifting operation. Mechanism for this purpose is shown in Figures 1, 3 and 8. This mechanism includes the valve 120 hereinabove mentioned which is interposed within the pump-motor circuit and is controlled by the gear control rods 27, 27' and 27" in a manner to be later explained. This valve includes a housing 138 bored to receive a plunger 139 reciprocable therein. The plunger is reduced at 140 and 141 to form spaced heads 142, 143 and 144. A longitudinal duct 145 and cross ducts 146 therein maintain communication between the spaces surrounding the reduced portions 140 and 141. An annular groove 147, always open to space 141, communicates with pipe 122; a similar groove 148, controlled by head 143, communicates with pipe 118; and a third groove 149, controlled by head 142, communicates with pipes 117 and 121. A spring 150 yieldably maintains the plunger 139 in the position shown in Figure 8, in which position the head 143 covers the groove 148, and thus substantially blocks the flow in pipe 118 to thereby resist operation of the motor 95. In this position of the plunger communication is established between pipes 121 and 122 through the ducts 145 and 146 so that the pump circuit is effectively by-passed and the pressure in pipe 117 leading to the motor is destroyed. It will be noted that head 143 is somewhat wider than the groove 148 but it is preferably formed with gashes 151 about the periphery thereof designed to provide for some leakage of liquid from the groove 148, to thereby avoid excessive pressures in the pipe 118 when the plunger is suddenly shifted into the position shown in Figure 8. The plunger is movable against the action of spring 150 into the position shown in Figure 3. In this position pipe 121 is open to pipe 117 through the groove 149 and pipe 118 is open to pipe 122 through the ducts 145 and 146, and the motor 95 is connected in driving relation with the pump 94.

The valve plunger 139 is controlled by three push pins 152, 152' and 152'' closely fitted for lengthwise reciprocation in separate bores 153, 153' and 153'' formed in the head of the valve housing. Pipes 154, 154' and 154'', leading from the respective bores, are controlled by valves 155, 155', and 155'', respectively. Each of the valves comprises a body portion 156 formed as an integral part of one of the cylinders 33, 33' or 33'' and bored longitudinally to receive a plunger having spaced heads 157 and 158, connected by a reduced portion 159, and a square stem 160 adapted to project transversely into the associated cylinder. The space surrounding the reduced portion 159 is supplied with liquid under pressure through a pipe 161, connected with the pipe 34 leading from the gear pump 35. An annular groove 162, controlled by the head 157, communicates with one of the pipes 154, 154' or 154''; and a similar groove 163 communicates through a pipe 164 with the exhaust pipe 45. A spring 165 yieldably retains each valve in the position assumed by valves 155 and 155' in Figures 1 and 3 with the stem 160 projecting into the path of reciprocation of one of the pistons 32, 32' or 32''. In the position of valves 155 and 155' pipes 154 and 154' are open to exhaust through pipe 164 and the corresponding push pins 152 and 152' are retracted. The front face of each piston 32, 32' and 32'' is bevelled off as shown at 166 for coaction with the bevelled end 167 of each stem 160 so that whenever one of the pistons is advanced into the position assumed by piston 32'' in Figures 3 and 4, the stem 160 is forced outwardly and the corresponding valve plunger shifted into the position assumed by valve 155'' in Figure 3. In this condition of valve 155'' pipe 154'' is exposed to the pressure in pipe 161 and the corresponding push pin 152'' is advanced, thereby shifting the plunger of valve 120 into the position shown in Figure 3.

A brief description of the operation of the several parts thus far described will now be given. With the tool carriage 16 in retracted position the main control valve 48 assumes the position shown in Figure 5 so that pipe 47'' is exposed to pressure and pipes 47, and 47' are open to exhaust, and so that rod 27'' has been advanced by the pressure in cylinder 33 and the other rods 27 and 27' are retracted by the pressure in cylinders 31 and 31'. Thus gear 21'' has been advanced into mesh with gear 22'' by the thrust of collar 28'' against the sleeve portion 26'' of forked arm 25'', and gears 21 and 21' have been withdrawn from engagement with gears 22 and 22', respectively, by the thrust of collars 29 and 29' against the sleeve portions 26 and 26' of forked arms 25 and 25'. With the piston 32'' thus advanced the stem 160 of valve 155'' is held in the outer position shown in Figure 3 so that pipe 154'' is exposed to pressure and the valve 120 is held in the position shown in Figure 3. Fluid pressure is thus transmitted from pipe 121 to pipe 117 to drive the motor 95, the fluid exhausting from the motor through pipes 118 and 122. The shaft 20 is thus driven at a speed corresponding to the speed of the motor and the spindle 10 is driven from shaft 20 at a relatively low speed through the low speed gear 21''. This condition normally maintains during the advance of the tool carriage 16, until the control valve 48, actuated thereby, reaches the position shown in Figure 2. Pipe 47' is then exposed to pressure and pipe 47'' opened to exhaust so that cylinder 33'' is opened to exhaust, permitting retraction of rod 27'' under the pressure in cylinder 31'', and so that cylinder 33' is exposed to pressure causing rod 27' to advance. It will be noted that during the retraction of rod 27'' the forked arm 25'' and gear 21'' remain unaffected until collar 29'' has made contact with the sleeve portion 26'' this idle movement of rod 27'' and piston 32'' being sufficient to release the stem 160 of valve 155'' and thus permit the plunger of this valve to assume the retracted position and thereby open pipe 154'' to the exhaust pipe 164. The pressure thus released in bore 153'' permits the plunger of valve 120 to assume the position shown in Figure 8. When this occurs, the exhaust pipe 118 from the motor is blocked by the head 143 of valve 120, and pipes 121 and 122 are opened to each other, thus promptly bringing the motor to rest and relieving the pressure between gears 22″ and 21″. Continued retraction of rod 27″ withdraws gear 21″ from gear 22″. Simultaneously the rod 27′ is advancing slowly in the manner hereinabove described causing the collar 28′ to engage the sleeve portion 26′ and ultimately forcing the gear 21′ into mesh with gear 22′. Just before the rod 27′ reaches a fully advanced position, the stem 160 of valve 155′ is forced outwardly by the piston 32′, thereby exposing the pipe 154′ to pressure and causing the plunger of valve 120 to reassume the position of Figure 3 under the thrust of the push pin 152′. This reconnects the motor in driving relation with the pump so that shaft 20 is again rendered active and spindle 10 is driven at moderate speeds through the intermediate gear 21′.

This condition normally maintains until, under the advance of the tool carriage, control valve 48 arrives at the position shown in Figure 6, exposing cylinder 33 to pressure and opening cylinder 33′ to exhaust. Rod 27 then advances slowly and rod 27′ retracts, causing the withdrawal of gear 21′ from gear 22′ and engagement of gear 21 with gear 22 to effect a high speed operation of the spindle. During the retraction of rod 27′ and piston 32′, stem 160 of valve 155′ is released and pipe 154′ opened to exhaust, permitting valve 120 to reassume the position shown in Figure 8, to thereby bring the motor to rest in the manner just described. The motor and spindle again remain at rest until the stem 160 of valve 155 is forced outwardly by the advance of piston 32 thereby exposing the pipe 154 to pressure, and forcing the plunger of control valve 120 into the position of Figure 3, by the thrust of push pin 152. The action of the motor is thus renewed and the spindle is driven at high speed through the high speed gear 21.

It will be noted that, because of the exceedingly slow motion of the plunger 59 of the control valve 48, in the machine shown, an extremely accurate formation of the piston heads 62 and 63 and cooperating grooves 70, 70′ and 70″ is required to insure proper functioning of the parts controlled thereby. For instance as the valve plunger 59 approaches the position shown in Figure 2 groove 70′ should be opened to the space between heads 62 and 63 simultaneously with the opening of groove 70″ to the space surrounding the reduced portion 68. Should the groove 70″ be opened to the space surrounding the reduced portion 68 before the groove 70′ is opened to the space between heads 62 and 63, the rod 27″ might be retracted, the stem 160 of valve 155″ released, the valve 120 shifted into the position shown in Figure 8, and the spindle 10 thus actually brought to rest before communication is actually established between pipe 47′ and the pressure pipe 71. Should this occur the machine would remain at rest and the cycle of operations above described would remain uncompleted. To guard against this contingency provision is preferably made for retarding the adjustment of valve 120 from the active position shown in Figure 3 to the blocking position of Figure 8. This is accomplished in this instance by introducing a throttle valve 170 of appropriate form within each of the pipes 164 by which any desired resistance to the escape of liquid from any of the bores 153, 153′ or 153″ may be had and the rate of adjustment of the valve 120 toward blocking position correspondingly regulated.

Provision is made in the machine shown for effecting a substantially uniform variation in the speed of operation of the spindle 10 between successive gear shifting periods and to this end use is made of the variable displacement characteristics of the pump and motor. In this instance two cams 171 and 172 are provided, cam 171 being designed to regulate pump displacement and cam 172 being designed to regulate motor displacement. Both are driven from the tool carriage 16 and are shown fixed to the vertical shaft 83, hereinabove mentioned. Provision is also made for manually adjusting these cams simultaneously through an appropriate hand wheel 173 fixed to shaft 83. Cam 171 cooperates with a pin 174 freely rotatable within the arm 175 of a lever rockably supported upon a fixed pivot 176. The other arm 177 of this lever is connected through a link 178 with one end 179 of a floating lever 180 pivotally connected intermediate its ends to the control stem 97 of the pump. The other end 181 of the floating lever is connected through a link 182, bell-crank 183, and link 184 with a hand lever 185 under the control of the operator. Cam 172 cooperates with a pin 186 freely rotatable in one end of a lever 187, rockably supported at its other end upon a pivot 188. Lever 187 is connected through a link 189, bell-crank 190, and link 191 with the control stem 128 of the motor. Appropriate springs 192 and 193 hold the pins 174 and 186 against their respective cams 171 and 172. Both pins 174 and 186 are similarly mounted so that a description of one will suffice for both. As indicated in Figure 10 pin 174 projects rigidly from one end of a spool 194 supported in spaced anti-friction bearings 195 and 196 within an appropriate socket 197 formed in the end of the lever arm 175.

It will be noted that cam 171 is formed with three sharp rises $x$, $x'$ and $x''$ and that cam 172 is formed with three similar rises $y$, $y'$ and $y''$. Rotation of the cams and movement of the plunger 59 and control valve 48 are so coordinated that when this plunger is in the position of Figure 5, pins 174 and 186 engage their respective cams at points adjacent the bases of the rises $x''$ and $y''$; as this plunger approximates the position shown in Figure 2, pins 174 and 186 pass over the respective rises $x'$ and $y'$ to the bases thereof; and as this plunger approximates the position shown in Figure 6 the pins pass over the respective rises $x$ and $y$.

With the pin 174 at the top of any of the rises $x$, $x'$ or $x''$ and the pin 186 at the top of the corresponding rise $y, y'$ or $y''$ the pump is in maximum displacement condition and the motor in minimum displacement condition, so that the motor is then operated at maximum speed. With the pin 174 at the base of any of the rises $x$, $x'$ or $x''$ and the pin 186 at the base of the corresponding rise $y, y'$ or $y''$ pump displacement is reduced and motor displacement is at a maximum, thereby effecting operation of the motor at a relatively slow speed. The motor speed is thus suddenly reduced from a maximum to a minimum as the pins pass from top to bottom of each pair of rises $x'$—$y'$ and $x$—$y$ and this occurs during each gear shifting period. In the machine shown there are only two gear shifting periods and the cams do not make a complete rotation so that the sharp rises $x''$ and $y''$ never actually come into play. The relative change in the speed of the motor, effected by changing the displacement of pump and motor, is preferably the same as the change in relative speed between the shaft 20 and spindle 10, effected by each gear shifting operation, so that the speed of the spindle is substantially the same immediately after each gear shifting operation as it was immediately prior to that gear shifting operation. Actual variation in spindle speeds thus occurs only between successive gear shifting periods by adjusting pump and motor displacements through the action of the cams.

In the machine shown cam 171 is formed with a gradual rise $p, p'$ and $p''$ leading from the base of each abrupt rise $x$, $x'$ and $x''$, and merging into a concentric portion $c, c'$ and $c''$ which continues to the top of the succeeding abrupt rise, so that the pin 174, following this contour, causes a gradual increase in pump displacement and thereafter maintains the pump at maximum displacement until the following gear shifting period. Cam 172 is formed with a concentric portion $d, d'$ and $d''$ leading from the base of each abrupt rise $y, y'$ and $y''$ and merging into a gradual rise $m, m'$ or $m''$ which continues to the top of the succeeding abrupt rise. Each concentric portion $d, d'$ and $d''$ is substantially coextensive with the corresponding gradual rise $p, p'$ or $p''$, and each gradual rise $m, m'$ and $m''$ is coextensive with the corresponding concentric portion $c, c'$ and $c''$, so that during the above described increase in pump displacement, motor displacement remains constant, and during the succeeding period, while pump displacement is maintained at a maximum, motor displacement is gradually reduced. Thus during each period between successive abrupt rises on the cams the speed of the motor is gradually increased, first by the gradual increase in pump displacement and thereafter by the gradual reduction in motor displacement.

For purposes of explanation let it be assumed that the machine is set up for producing a facing cut upon a piece of work $a$, having an outside diameter of twenty inches, by the action of the tool 19 which is slowly advanced across the face of the work, to substantially a quarter of an inch from the center thereof, as the work is rotated with and by the spindle 10. It is quite obvious that in order to maintain the actual cutting speed substantially constant in all positions of the tool 19, the speed of rotation of the work must increase inversely as the distance between the tool and center of rotation. Let it also be assumed that the pump is driven at constant speed, that pump displacement is varied from three quarters to full stroke, and that motor displacement is varied from full stroke to four tenths. This variation alone will provide an increase in motor speed of about three and one third times its slow speed. Let it also be assumed that each pair of gears $21'$—$22'$, and 21—22 will provide a speed ratio between shaft 20 and spindle 10, three and one third times as great as the ratio provided by the preceding pair. As the tool advances inwardly from the periphery of the work toward the center of rotation, the speed of the motor is gradually increased in the manner described, and at a rate inversely proportional to the distance of the tool from the center of rotation, until a speed has been attained three and a third times the original speed. At this point the first gear shifting operation occurs, gears $21''$ and $22''$ being disengaged and gears $21'$ and $22'$ engaged, to thereby increase the ratio between shaft 20 and spindle 10 three and one-third times. Simultaneously the speed of the motor is automatically reduced to the starting speed by the reduction of pump displacement and the increase in motor displacement, so that the actual speed of rotation of the work is the same immediately after it was immediately preceding this gear shifting operation. Thereafter the motor speed is again gradually increased as the tool advances until the speed of rotation of the work has increased to three and one third times the speed attained immediately prior to the first gear shifting period. At this point gears $21'$ and $22'$ are automatically disengaged and gears 21 and 22 engaged and the ratio between shaft 20 and spindle 10 again increased three and one-third times; and the speed of the motor is again simultaneously reduced to its original speed. Thereafter the motor speed again gradually increases in the manner described until the tool reaches the end of the cut. With the parts proportioned and correlated in the manner described the speed of rotation of the work is increased gradually from about nineteen revolutions per minute to about seven hundred revolutions per minute thereby maintaining a uniform cutting speed of about one hundred feet per minute in all positions of the tool.

Whenever a new tool is brought into play, either by rotation of the turret 17 or by actual replacement of the tool 19, adjustment of the cams 171 and 172 relative to the carriage 16 is permitted by withdrawal and readjustment of the pinion 88 with respect to the rack 89. Such an adjustment is desirable in order to compensate for the variation in location of the actual cutting edge of the new tool. To facilitate setting up the machine for each new tool and work, an appropriate graduated scale 200 is provided on the face of the cam 171, which cooperates with a fixed pointer 201, to indicate the proper setting of the cams to correspond with the distance of the cutting edge of the tool from the center of rotation of the work. The scale shown is graduated in inches corresponding to the diameter of the path traced by the tool upon the work.

In the event that the work calls for the use of a tool operating on a fixed diameter, such as a boring tool 15, the cams 171 and 172 may be disconnected from the carriage 16, by opening the clutch 85, and thereafter adjusted to a position corresponding to the diameter of the hole to be bored, and as indicated on the scale 200. Proper adjustment of the cams will insure rotation of the work at the speed appropriate for the boring operation. After the boring operation is completed the clutch 85 is again closed. The fact that the clutch is a single tooth rather than a multiple tooth clutch assists the operator in reestablishing the relation which existed between the cams and carriage prior to the opening of the clutch.

From the foregoing it will be noted that pump displacement is normally regulated by the setting or operation of the cam 171, variation in pump displacement being effected by movements of the floating lever 180 under the action of the lever arm 175. It will also be noted that pump displacement may also be varied by adjusting the hand lever 185, to thereby adjust the end 181 of the floating lever 180 and consequently the pump control stem 97. The hand lever 185 remains fixed during normal operation of the machine. This lever is adjusted only when special circumstances such as softer or harder work material require automatic operation of the machine at speeds other than the speed assumed at normal.

Provision is also made for stopping, starting or reversing the machine at the will of the operator. In this instance the valve 119 hereinabove referred to is provided for this purpose. This valve comprises a cylindrical housing 205 longitudinally bored as at 206, to receive a plunger having two spaced heads 207 and 208, connected by a reduced portion 209. The opposite ends of the bore 206 are permanently connected through a passage 210, which in turn communicates with pipe 98 normally constituting the return side of the pump circuit. A groove 211, connected with pipe 121, is controlled by piston head 207; a similar groove 212, connected with pipe 122, is controlled by piston head 208; and an intermediate groove 213, connected with the pipe 99, constituting the working side of the pump circuit, is always in communication with that space between the heads 207 and 208. The arrangement is such that when the valve plunger is in the left extreme position shown in Figure 3, pipe 99 is open to pipe 121, and pipe 98 communicates through passage 210, with pipe 122. The motor is then driven by the liquid discharged from the pump through pipes 99, 121, and 117. When the valve plunger is in the right extreme position of Figure 8, pipe 99 is open to pipe 122 and pipe 98 is open to pipe 121, so that the direction of flow in pipes 121 and 122 is reversed and the operation of the motor and the entire machine is reversed. To stop the machine the valve plunger is shifted into an intermediate position wherein piston head 208 covers groove 212 to thereby block the flow of liquid from the motor through pipe 122, and wherein piston head 207 assumes a position intermediate the groove 211 to thereby open communication between pipes 98 and 99 and thus by-pass the pump circuit. The piston head 208 is preferably gashed as at 214, in a manner similar to the gashes 151 in the head 143 of valve 120 and for a similar purpose. The plunger of valve 119 is controlled by a stem 215, connected through a link 216, bell-crank 217, and link 218 with an appropriate hand lever 219 under the control of the operator.

Various changes may be made in the embodiment of the invention hereinabove described without departing from or sacrificing any of the advantages of the invention as defined in the appended claims.

I claim:—

1. The combination with a driven member, of a variable speed hydraulic transmission for driving said member, change speed mechanism between said transmission and member adjustable to vary the speed ratio therebetween, a control element and means responsive to said control element for adjusting said transmission and said mechanism alternately in predetermined sequence.

2. The combination with a driven member, of a pump, a variable displacement hydraulic motor driven by said pump, means for regulating motor displacement, change speed mechanism between said motor and member, means for adjusting said change speed mechanism to vary the speed ratio between said motor and member, and unitary means for controlling said displacement regulating means and said adjusting means.

3. The combination with a driven member of a variable displacement pump, means for regulating pump displacement, a hydraulic motor driven by said pump, change speed mechanism between said motor and member, a control element, and means responsive to said control element for operating said regulating means and for adjusting said change speed mechanism in predetermined sequence to vary the speed of said member.

4. The combination with a driven member, of a variable displacement pump, a variable displacement hydraulic motor driven by said pump, means for regulating pump displacement, means for regulating motor displacement, change speed mechanism driven by said motor for driving said member, means for adjusting said change speed mechanism to thereby vary the speed ratio between said motor and member, a control element, and means responsive to the position of said control element for controlling both of said regulating means and said adjusting means.

5. The combination with a driven member, of a variable displacement pump, a variable displacement hydraulic motor driven by said pump, means for regulating pump displacement, means for regulating motor displacement, change speed mechanism driven by said motor for driving said member, means for adjusting said change speed mechanism, and means for operating both of said regulating means and said adjusting means in predetermined sequence to thereby vary the speed of said member.

6. The combination with a driven member, of a variable speed hydraulic transmission including a hydraulic motor, change speed mechanism driven by said motor for driving said member, means coacting with said hydraulic transmission for gradually increasing and abruptly decreasing the speed of said motor alternately, and means for adjusting said change speed mechanism to increase the speed ratio between said motor and member during each abrupt reduction in the speed of said motor to thereby effect a gradual increase in the speed of said member throughout a wide range.

7. The combination with a driven member, of a variable speed hydraulic transmission including a hydraulic motor, change speed mechanism driven by said motor for driving said member, means coacting with said hydraulic transmission for gradually increasing and abruptly decreasing the speed of said motor alternately, means for adjusting said change speed mechanism to increase the speed ratio between said motor and member during each abrupt reduction in the speed of said motor, and means for rendering said motor momentarily inactive during each operation of said adjusting means.

8. The combination with a driven member, of a hydraulic motor, means for driving said motor, a change speed mechanism driven by said motor for driving said member, means automatically operable to adjust said change speed mechanism at predetermined intervals, and means for rendering said motor momentarily inactive during each adjustment of said change speed mechanism.

9. The combination of a rotary work holder, a tool carrier movable toward and from the axis of rotation of said first named member, a variable speed hydraulic transmission for driving said rotary work holder, and control mechanism for said transmission automatically operable to regulate the speed of said rotary work holder in accordance with the position of said tool carrier.

10. The combination of a rotary work holder, a tool carrier movable toward and from the axis of rotation of said work holder, a variable speed hydraulic transmission for driving said rotary member, said transmission including a variable displacement hydraulic motor, and displacement regulating means for said motor responsive to the position of said tool carrier relative to said axis of rotation for regulating the speed of said motor.

11. The combination of a rotary member, a second member movable toward and from the axis of rotation of said member, means including two variable speed transmissions for driving said rotary member, separate regulating means for each transmission, and means responsive to the movement of said second member for controlling both of said regulating means.

12. The combination of a rotary work holder, a tool carriage movable toward and from the axis of rotation of said work holder, a variable speed drive for said work holder including a hydraulic variable speed transmission and a variable speed gear transmission, and means controlled by said carriage for adjusting both of said transmissions to thereby regulate the speed of said work holder.

13. The combination of a rotary work holder, a tool holder movable toward and from the axis of rotation of said work holder, driving means for said work holder comprising a variable displacement hydraulic motor and a variable speed gear transmission, and means responsive to the movement of said tool holder for regulating motor displacement and for adjusting said transmission to thereby regulate the speed of said work holder.

14. The combination of a driven member, driving means therefor including a variable displacement hydraulic motor and a variable speed gear transmission, a control element, means responsive to movement of said control element for regulating motor displacement and means responsive to movement of said control element for adjusting said transmission.

15. The combination of a driven member, driving means therefor including a variable speed hydraulic transmission and a variable speed gear transmission, a control element, means responsive to movement of said control element for adjusting said hydraulic transmission, and means responsive to movement of said control element for adjusting said gear transmission.

In witness whereof, I hereunto subscribe my name this 18th day of April, 1927.

WALTER FERRIS.